United States Patent [19]
Goodman

[11] 3,733,708
[45] May 22, 1973

[54] NAVIGATIONAL AID

[76] Inventor: Charles Jimmie Goodman, 1742 Temple Drive, Winter Park, Fla. 32789

[22] Filed: Mar. 15, 1971

[21] Appl. No.: 124,287

[52] U.S. Cl. .................. 33/355, 33/15 D, 33/148 E
[51] Int. Cl. .......................... F26b 11/18, G01b 5/00
[58] Field of Search ..................... 33/149 R, 148 E, 33/15 D, 1 R, 355

[56] References Cited

UNITED STATES PATENTS

| | | | |
|---|---|---|---|
| 2,551,997 | 5/1951 | Cody | 33/148 E X |
| 2,435,606 | 2/1948 | Sadowsky | 33/148 E |
| 2,495,777 | 1/1950 | Schroeder | 33/1 SD |
| 2,508,894 | 5/1950 | Schloer | 33/148 E X |
| 3,535,788 | 10/1970 | Sena | 33/1 SD |

Primary Examiner—William D. Martin, Jr.
Attorney—Duckworth & Hobby

[57] ABSTRACT

A time, speed and distance computer apparatus having a prong fixed to a surface having indicia thereon and a second prong rotatably connected to the surface so that it can pass over the indicia. The two prongs can be placed on two points on the surface of a map for instantaneous determination of the time required to travel between the two points at predetermined speeds. The apparatus may also have a compass associated therewith for use in orienting the surface of the map, or the like.

1 Claim, 3 Drawing Figures

PATENTED MAY 22 1973  3,733,708

Charles J. Goodman
INVENTOR

By Duckworth & Hobby

Attorneys

NAVIGATIONAL AID

BACKGROUND OF THE INVENTION

The present invention relates to time, speed and distance computers, and especially to time, speed and distance computers adapted for use in connection with a map for a more rapid and simple determination of time, speed or distance from any two of the known time, speed or distance factors, and may have an integral compass associated therewith.

In the past there have been numerous computers for calculating time, speed and distance to aid airplane pilots, or the like, whereby a navigator can determine from his speed and elapsed time the approximate statutory miles travelled or, alternatively, can determine in minutes required to travel between two points a known distance at a known speed. These prior art devices usually involve a circular slide-rule type apparatus and sometimes involve additional factors such as solving wind vector problems. Typical prior art devices can be seen in U.S. Pat. No. 3,282,501 for a Time, Speed and Distance Computer, U.S. Pat. No. 3,497,681 for a Navigational Computer, U.S. Pat. No. 3,255,961 for a Navigational Aid, U.S. Pat. No. 1,277,723 for a Time Computing Device, U.S. Pat. No. 3,279,695 for a Position Computer, and U.S. Pat. No. 3,471,084 for a Trigonometric Aeronautical Computer. However, these prior art devices require first utilizing a map to determine manually the distance between two points, inserting this in the computer along with the speed to be travelled to determine the approximate time required to travel between the points. These devices also require manipulation of the computers which generally have various other calculations involved therewith and can become quite complex. Accordingly, it is one object of the present invention to provide a time, speed and distance computer, which is utilized directly with the map for calculating the distance for a rapid determination of the time required to travel between two points on the map at various speeds.

It is another object of the present invention to provide a device for determining time, speed or distance, which has an integral compass therewith for use in connection with a map for rapid determination of an unknown factor, but while having a compass handy for alignment of the map and for other calculations, as desired.

SUMMARY OF THE INVENTION

The present invention relates to a navigational instrument, and especially to a time, speed and distance computer apparatus having a flat indicia faced member or surface attached to a pointed member or prong extending therefrom which can be placed on a point of the surface of a map. A second prong or pointed member is rotatably mounted to the surface in a manner that it rotates to pass over the indicia on the surface member with its pointed end also being adapted for placement on the surface of the map simultaneously with the fixed prong. The rotatable pointed prong has indicating means to indicate on the indicia on the surface the time minimal required to move between points on which the prongs have been placed on the map when travelling at predetermined speeds, or alternatively to determine the distance on the map or the speed to travel a certain distance in a predetermined time. The instrument is also provided with an integral compass for aligning the map or determining the direction of travel, as desired by the navigator and the flat surface may have indicia on both sides for continuing from one side to the other by turning or rotating the flat surface on one of its prongs for extending the area of operation of a surface of predetermined size.

BRIEF DESCRIPTION OF THE DRAWINGS

Other objects, features and advantages of this invention will be apparent from a study of the written description and the drawings, in which.

DESCRIPTION OF THE PREFERRED EMBODIMENT

Figure 1:
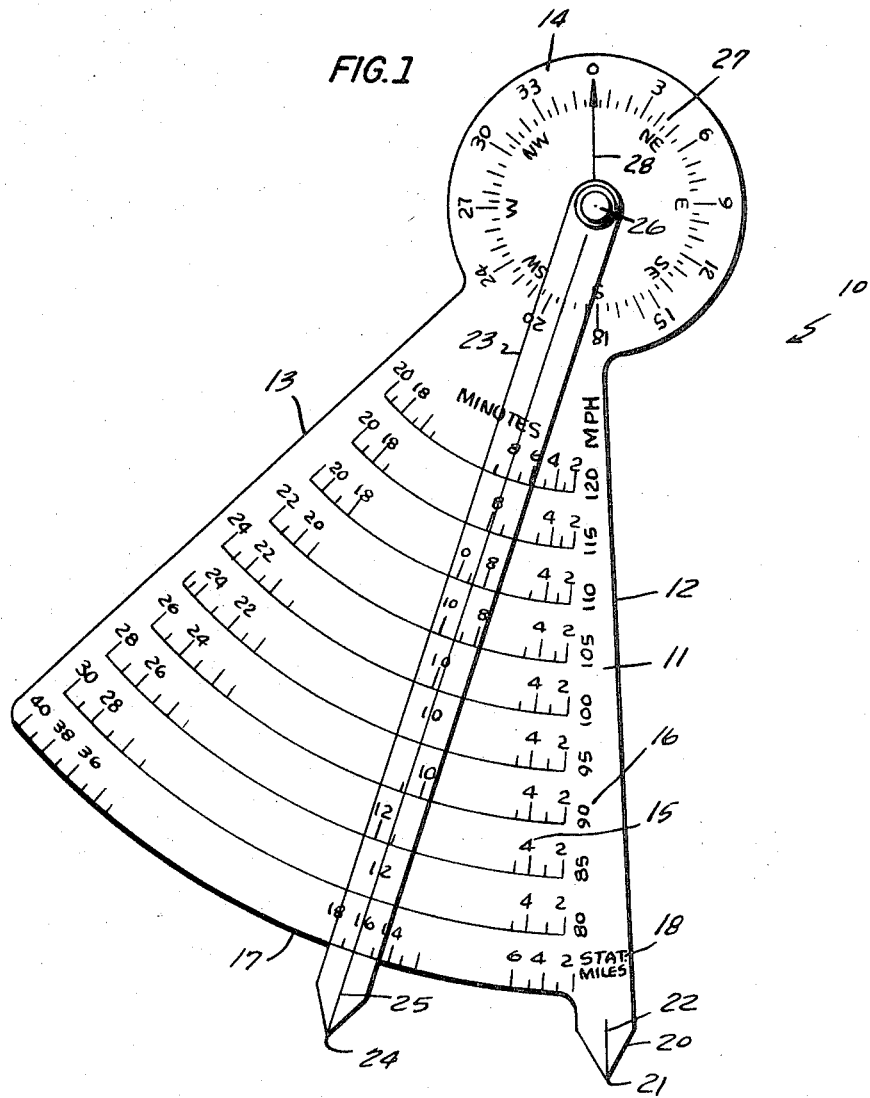
FIG. 1 is a plan view of one preferred embodiment of the present invention.

Referring now to FIG. 1 of the drawings, there can be seen a preferred embodiment of the present invention 10 having a flat surface member 11 with a pair of angular sides 12 and 13 and a rounded top portion 14. The flat member 12 has a series of rows of minute graduations 15 which are identified at each end by speeds in miles per hour 16 and at the bottom portion 17, which may be generally arcuate shaped, are a list of graduated distances in statute miles 18. The flat member 11 has at one end a prong 20 having a pointed end 21 and an indicating line 22 thereon. A second prong 23 has a pointed end 24 along with an indicator line 25 running thereby, and extending over the surface 11 to the center 26 of the circle 14, where it is rotatably mounted thereto. Arm 23 may be of a transparent or lucent material so that you can see through it, and swings across the flat surface 11 so that indicator line 25 can be lined up with the indicia 15 and 18 of the surface 11. A circle 14 has a compass face 27 thereon and a compass needle or dial 28 for pointing to the magnetic north pole and indicating the direction of travel when used in connection with a map that the apparatus 10 is being used with. This is facilitated by having the north-south line up with the side 12 of the apparatus which may advantageously be used as a rule or guide for marking a map. The present navigational aid is directed for use with a map having a scale the same as incorporated in the unit 10 as illustrated by the statute miles 18. Thus the placement of the prong 20 on a map at one point and the swinging of the arm 23 to a second point will align the indicator line 25 with the statutory miles 18 between the points, quickly indicating the straight line distance between the two points. At the same time if the speed is known or estimated, it can be read at 16 and a line followed over to indicate the number of minutes it would take to travel at that speed to go between the two points. Thus, when the device is used in connection with a map, it gives a rapid indication of mileage between points, as well as the minutes or time it takes to travel between the points at the indicated speed. It is noted that most of the maps used by airplane pilots and navigators are of the same general scale so that the device is useful in most of the maps usually kept on the airplanes. If it is anticipated that greater distances are to be measured, the device can be extended by continuing the scales or indicia on the opposite side of the flat surface 11, extending the arm 23 to the last point or 40 statute miles as shown, rotating the device to continue the miles to the next point, or alternatively, it could be accomplished using only one side by simply marking and moving the probe 20 in a series of steps. However, in typical air travel, small portions are measured at one time to keep a continuous track of the mileage and time. By having the compass 27 incorporated into the apparatus the maps can be advantageously lined up or directions can be ascertained at the same time as calculating a flight plan, or the like.

Figure 2:
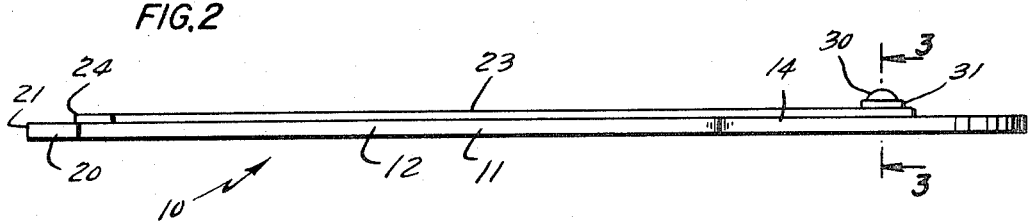
FIG. 2 is a sectional view of one side of the invention.
Figure 3:
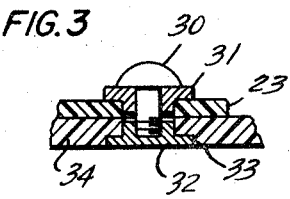
FIG. 3 is a sectional view taken along line 3—3 of FIG. 2.

Turning now to FIG. 2, a side view of the present invention illustrates the navigational aid 10 having one side 12 along with the fixed prong 20 and the movable prong or arm 23 having the pointed end 24, fixed prong of course having the pointed prong 21. The movable arm 23 is attached to the surface 11 by a bolt 30 passing through a lubricating member 31 which prevents the arm 23 from rubbing directly against the bolt 30 and thereby tightening or loosening it, and may be made of a lubricating solid material such as teflon or nylon for easier rotation of the arm 23. This is more clearly shown in FIG. 3, where bolt 30 passes through the arm 23 but is isolated therefrom by the member 31. A second member 32 is also utilized and which fits into a circular ledge or sink 33 so that the opposite side 34 of the side 11 will be a smooth surface for placing the unit flat on the map. It will be appreciated at this point that a simple navigation device has been provided for use with a map which is especially useful for the rapid determination of statute miles between two points and determining the time necessary to travel between the points at predetermined speeds and which also advantageously provides a compass for lining up the map and direction of travel and a smooth surface for drawing lines on the map as desired.

However, it should be appreciated that this invention is not to be construed as limited to the particular forms disclosed herein, since these are to be regarded as illustrative rather than restrictive.

I claim:

1. A time, speed, distance and direction computer apparatus comprising in combination: a flat indicia faced member having a pointed member extending therefrom adapted for placement on the surface of a map; a transparent pointed member rotatably mounted in said flat indicia faced member and extending across said indicia, said transparent pointed member adapted to be placed on the surface of said map at the same time said pointed member is placed thereon; said transparent pointed member having means thereon to indicate from the indicia on said flat faced member the time interval required to move between the points on said map that said pointed members are placed at predetermined speeds; said flat faced member indicia including a plurality of speeds spaced thereon and having a minutes scale curved to follow the rotation of said transparent pointed member at said predetermined spaced speeds and also having a scale running parallel to said minutes scale indicating distance between said points on said map; and a compass located on the face of said flat faced member, said compass face having graduated indicia thereon located at least partially around the rotatable connection of said transparent pointed member on said flat faced member and having magnetic north pointing needle rotatably mounted to point toward said compass face graduated indicia, the north-south line of said compass face being aligned with one edge of said flat faced member, said edge being substantially straight to act as a guide for marking directions in accordance with said compass.

* * * * *